(12) United States Patent
Bleier et al.

(10) Patent No.: US 10,641,989 B2
(45) Date of Patent: *May 5, 2020

(54) MOUNT FOR AN OPTICAL STRUCTURE HAVING A FLANGED PROTRUDING MEMBER AND METHOD OF MOUNTING AN OPTICAL STRUCTURE USING SUCH MOUNT

(71) Applicant: PLX, Inc., Deer Park, NY (US)

(72) Inventors: Zvi Bleier, Melville, NY (US); Itai Vishnia, Setauket, NY (US); Zechariah Gajadhar, Islandia, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,926

(22) Filed: Jul. 30, 2019

(65) Prior Publication Data

US 2019/0353873 A1 Nov. 21, 2019

Related U.S. Application Data

(63) Continuation of application No. 15/492,703, filed on Apr. 20, 2017, now Pat. No. 10,393,994.

(60) Provisional application No. 62/324,942, filed on Apr. 20, 2016.

(51) Int. Cl.
*G02B 5/122* (2006.01)
*G02B 7/182* (2006.01)
*G02B 7/18* (2006.01)

(52) U.S. Cl.
CPC .............. *G02B 7/182* (2013.01); *G02B 5/122* (2013.01); *G02B 7/181* (2013.01)

(58) Field of Classification Search
CPC ........ G02B 5/122; G02B 7/006; G02B 7/182; G02B 7/1825; G02B 7/00
USPC .......................................................... 359/529
See application file for complete search history.

(56) References Cited

U.S. PATENT DOCUMENTS

| | | | | |
|---|---|---|---|---|
| 6,786,608 | B1 * | 9/2004 | Bleier | G02B 27/646 359/515 |
| 8,083,359 | B2 * | 12/2011 | Mohazzab | G02B 7/182 359/529 |
| 2007/0295155 | A1 * | 12/2007 | Bleier | G02B 7/1805 74/594.1 |

* cited by examiner

*Primary Examiner* — Euncha P Cherry
(74) *Attorney, Agent, or Firm* — Kaplan Breyer Schwarz, LLP (57) ABSTRACT

An improved mount for, and method of mounting an, optical structure is provided. The mount has an optical structure comprising at least one mirror panel, the mirror panel comprising a reflective surface and a back surface substantially opposite the reflective surface, a protruding member extending from the back surface of the optical structure, the protruding member having a shape and the shape having an outside surface there-around, a base comprising a mounting element and an upper element extending from the mounting element, the upper element having a cavity for secured receipt therein of at least a portion of the protruding member, wherein the receiving cavity of the upper element has a shape identical to that of the shape of the protruding member, but where the shape of the protruding member is ten thousandths (1/10,000) of an inch smaller than the shape of the receiving cavity so that the outside surface of the protruding member is ten thousandths (1/10,000) of an inch away from the corresponding parts of the receiving cavity when the protruding member is secured within the cavity.

18 Claims, 7 Drawing Sheets

MOUNT FOR AN OPTICAL STRUCTURE HAVING A FLANGED PROTRUDING MEMBER AND METHOD OF MOUNTING AN OPTICAL STRUCTURE USING SUCH MOUNT

This application is a continuation application of U.S. patent application Ser. No. 15/492,703, filed Apr. 20, 2017, and claims the benefit of the filing date of, and priority to, U.S. Provisional Application No. 62/324,942, filed Apr. 20, 2016, the entirety of all of such applications are incorporated herein by reference.

BACKGROUND

This disclosure relates to the field of mounts for optical structures, including but not limited to, reflective panels and hollow retroreflectors.

Optical structures such as, but not limited to, reflective panels (mirror panels) and hollow retroreflectors are old in the art. Hollow retroreflectors are made of three mirror panels joined together, each preferably having an optically flat reflective surface disposed at a right angle to the reflective surface of each of the other two panels. Where all three panels meet can be described as a common inside corner of an imaginary cube, or apex. Hollow retroreflectors have the property of causing incident and reflected light rays to travel along substantially parallel paths.

When hollow retroreflectors are assembled for high accuracy and precision it is important to maintain the mutual perpendicularity of the reflective surfaces and sometimes essential to ensure that the retroreflector as a whole does not move. The perpendicularity of the reflective surfaces is affected by external stresses. With regard to high accuracy and precise reflective panels, such as mirror panels to be used for high accuracy purposes, it is also important to try and maintain as optically flat as possible the reflective surfaces of the panels. Accordingly, external stresses cause distortion to the optical flatness of the reflective surfaces of the reflective panels of a hollow retroreflector and these distortions will then cause distortion to the exiting wavefront of the exiting light ray. Such distortion of the exiting light ray increases beam deviation, thereby causing the exiting light ray to no longer be parallel to the entering (incident) light ray.

SUMMARY

Examples of external stresses that can affect the optical flatness of a reflective panel, and/or the perpendicularity of reflective surfaces of abutting reflective panels of a hollow retroreflector, are thermal expansion or contraction of the substrate material from which the panels are made, deflection caused by curing of the adhesives used to join elements together and/or deflection caused by curing of adhesives between, or tightening together of, the reflective panel(s) and the item to which it is mounted and/or the mass of the panels themselves. Accordingly, it would be desirable to assemble together the elements of a hollow retroreflector or of an optical filter, and/or to assemble a reflective panel to a mount, in such a manner as to reduce these stresses. It would also be desirable that the manner of mounting an optical filter, reflective panel(s) and/or a retroreflector to its mount not add to these stresses, but nevertheless, securely retain the optical filter, reflective panel(s) and/or retroreflector on the mount.

Additionally, any prior art mounts that may include flexible materials cannot, and do not, maintain the dimensional stability ("DS") such that various forces working on a connected optical structure may be constantly changing the dimensions of that optical structure.

The present mount also achieves secure mounting of the optical structure in a manner designed to help eliminate deflective stresses on the reflective surface(s) of the structure caused by the mounting of the optical structure, such as the retroreflector, to its mount. One or more aspects of the present mount also achieves DS, such that a "hard mount" is achieved. In particular, for measurement of the DS of a hollow retroreflector and its mounting to another structure, it is important to maintain perfect Optical Path Difference ("OPD") between the incident and reflected light rays. To accomplish this in a hard mount configuration like that of the subject disclosure, it is important that the dimensional relationship between the reflective surfaces of the retroreflector that is attached to another structure via the mounting assembly and the apex of the retroreflector be maintained in all environmental conditions and changes in those environmental conditions.

The mount also allows for easy and secure mounting of the optical structure onto a support structure.

Accordingly, it is an object of the invention to provide an improved mount for an optical structure.

Another object of the invention is to provide an improved mount for an optical structure which causes minimal external stresses to the reflective surfaces of the optical structure.

Still another object of the invention is to provide an improved mount for an optical structure wherein the mount achieves reductions in movement of the optical structure in order to achieve higher-accuracy distance measurements.

Yet a further object of the invention is to provide an improved mount for an optical structure wherein the mounting of the mount and optical structure to a support structure is easy and secure and adds no distortion to any of the wavefronts of the optical structure.

It is even a further object of the invention to provide an improved method of mounting an optical structure using the improved mount.

Other objects of the invention will in part be obvious and will in part be apparent from the following description.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown. To assist those of ordinary skill in the relevant art in making and using the subject matter hereof, reference is made to the appended drawings and figures, wherein.

DETAILED DESCRIPTION OF THE PREFERRED EMBODIMENTS

Figure 1:
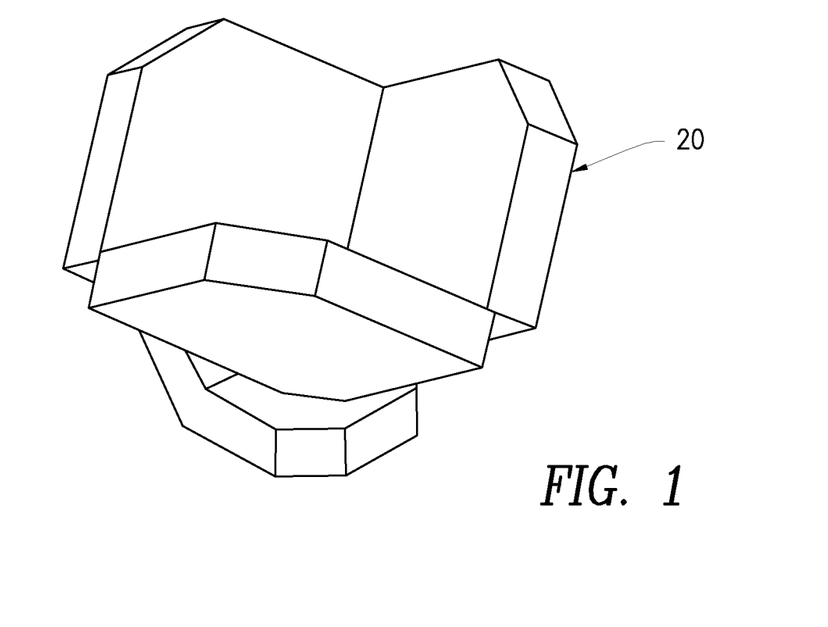
FIG. 1 is a perspective view of a first embodiment of the subject invention.
Figure 2:
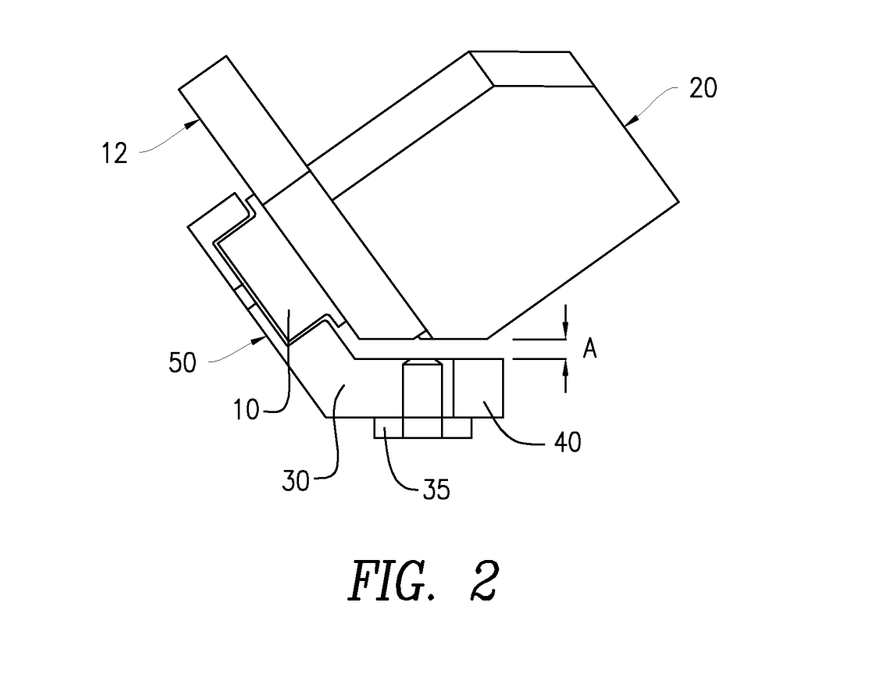
FIG. 2 is a side elevational view of the structure of FIG. 1.
Figure 3:
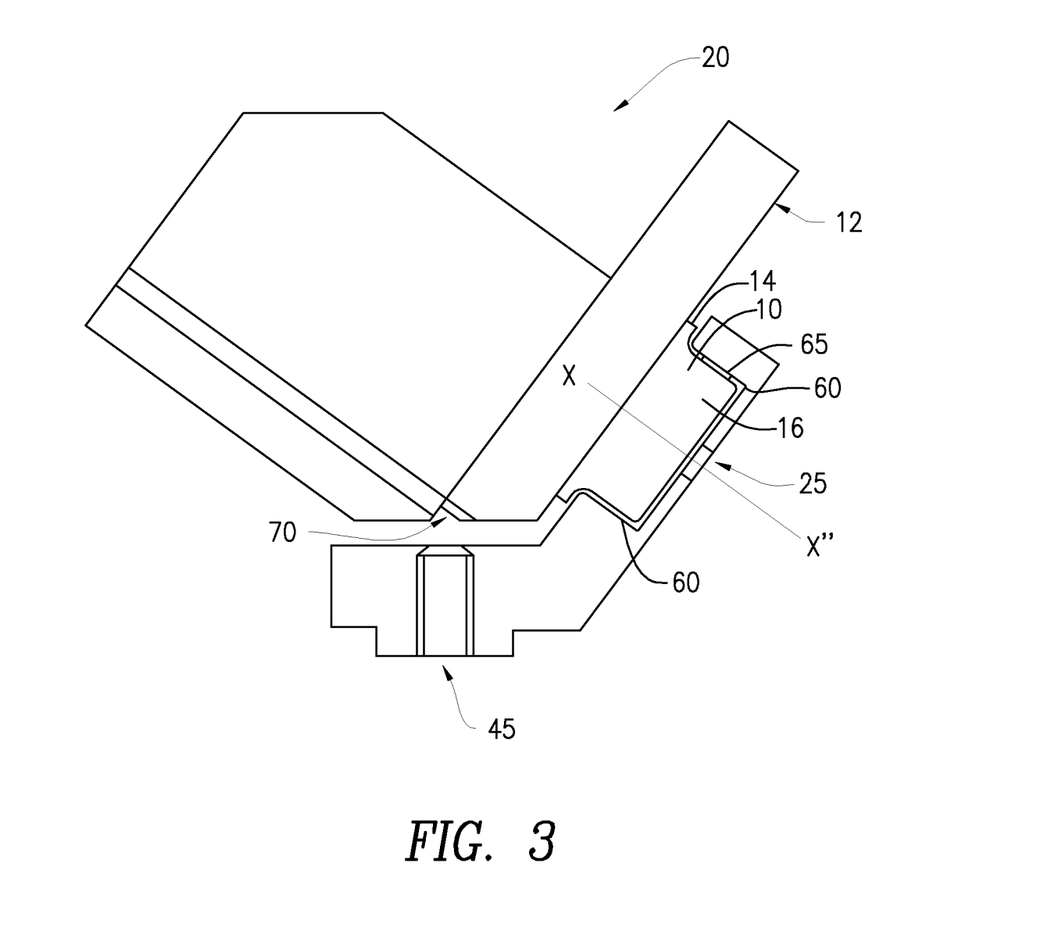
FIG. 3 is a cross-sectional view of the structure of FIG. 1.

In accordance with the invention, an improved mount for, and method of mounting, an optical structure is provided. As is shown in FIGS. 1-3, the mount has a protruding member 10 extending from a surface 12 of the optical structure 20, a base element 30 having a mounting structure 40 for mounting the mount to another structure and an upper element 50 extending from the base element 30 having a first cavity 60 extending therein for receipt within the cavity of at least a portion of protruding member 10.

Protruding member 10 is preferably circular in shape, having an axis X running through its center and a diameter. A first portion 14 of the protruding member has a first diameter and a second portion 16 of the protruding member has a second diameter. The first portion is located between the second portion and the optical structure and its diameter is larger than that of the second diameter of the second portion of the protruding member. It is the second portion of the protruding member that extends into and is secured within first cavity 60 of base element 30.

While protruding member 10 and first cavity 60 are preferably circular, they may take on any geometric shape.

First cavity 60 is sized to have second portion 16 of protruding member 10 fit snuggly within. The diameter of the first cavity is therefore only 0.010 of an inch larger than the diameter of the second portion of the protruding member. In a first embodiment, an adhesive 65, preferably, but not limited to, Milbond, is applied to the circumference of the second portion of the protruding member at approximately 0.010 of an inch thickness so as to fill the gap between the circumference of the second portion of the protruding member and the inside surface of the first cavity. There is also an opening 25 extending through the bottom of cavity 60. This opening allows air to escape from the cavity when the protruding member is being inserted therein. Without the opening, the air would be trapped in cavity 60 as the second portion of the protruding member is inserted therein, and in its efforts to escape (as it must), the escaping air would push through and cause disruption and bubbling in the adhesive material 65.

Figure 4:
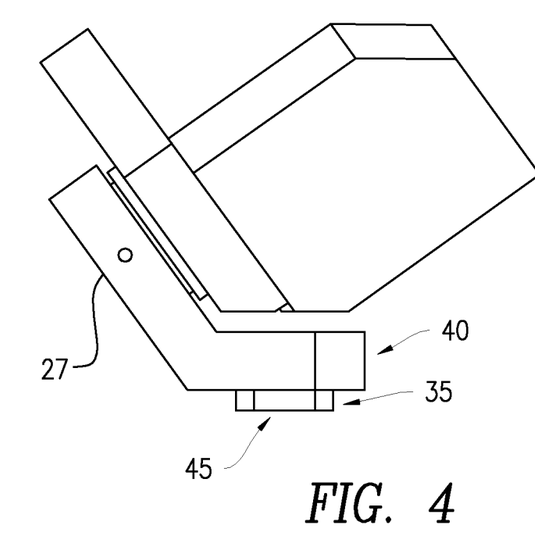
FIG. 4 is a side elevational view of a second embodiment of the structure of FIG. 1.
Figure 5:
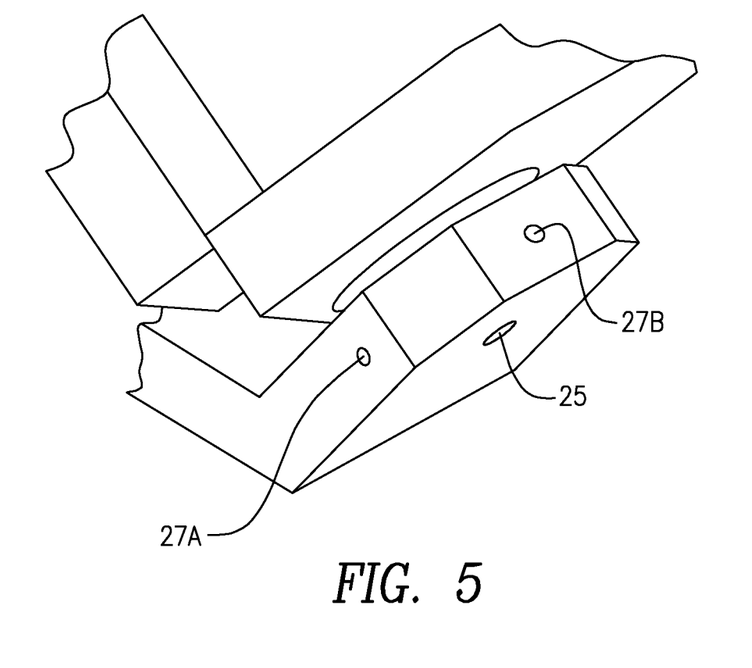
FIG. 5 is a partial perspective view of the structure of FIG. 4.

In a second embodiment of FIG. 4, in addition to opening 25 through the bottom of cavity 60, an opening 27 extends through a side of cavity 60 so that there is communication between the cavity and the outside of the mounting structure along the circumference of second portion 16 of the protruding member. In this embodiment, while a purpose of opening 27 is to also allow a release path for air in cavity 60 trying to escape as the protruding member is inserted therein, its more important purpose is for use as an injection port through which adhesive 65 may be injected into cavity 60 after the protruding member is already inserted therein. When opening 27 is used as an injection port, opening 25 also allows for the escaping air to be forced out by the injection process.

In yet another embodiment of FIGS. 5-10, multiple openings are provided along the side of cavity 60 (as is opening 27) to be used for either injection of adhesive into the cavity, or for insertion of mounting pins therethrough. For example, openings 27A, 27B, 27C, etc., can be used for injection of the adhesive or for the insertion therein and therethrough of mounting pins (not shown). The mounting pins are used for both centering second portion 16 of protruding member 10 within cavity 60, and then as the mounting pins that get secured within openings 27A, 27B, 27C, etc., they press upon the circumference of second portion 16 to hold the protruding member within cavity 60. In this embodiment, opening 25 plays its same dual air release role as in the second embodiment.

Figure 6:
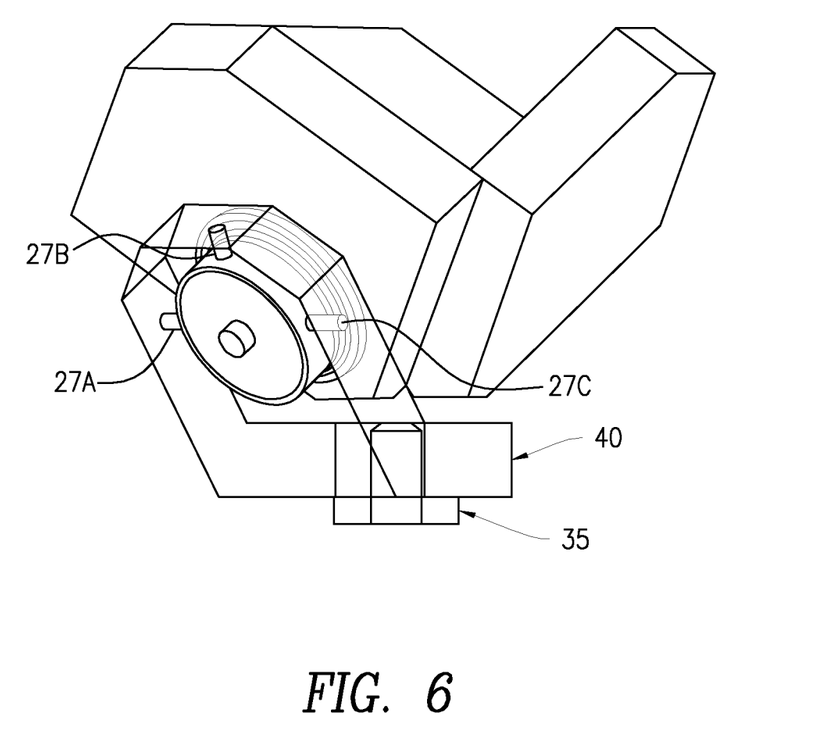
FIG. 6 is a back perspective view of the structure of FIG. 4.
Figure 7:
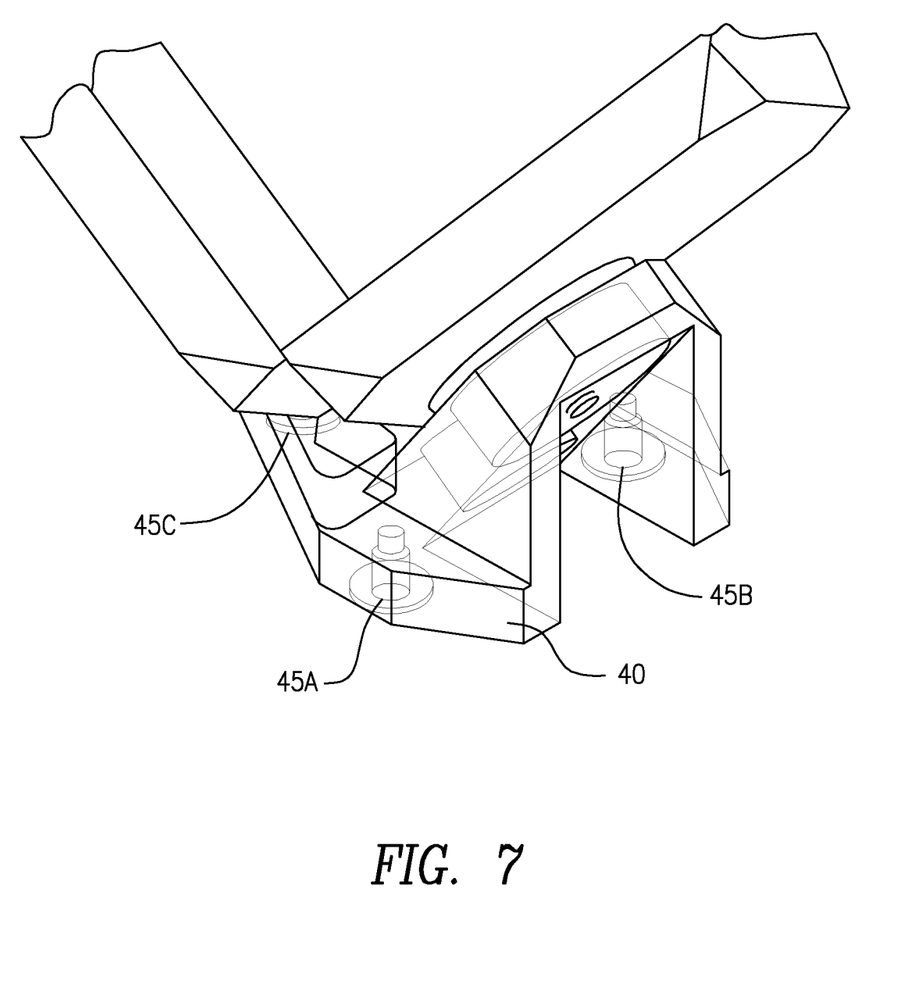
FIG. 7 is a back perspective view of a third embodiment of the invention.
Figure 8:
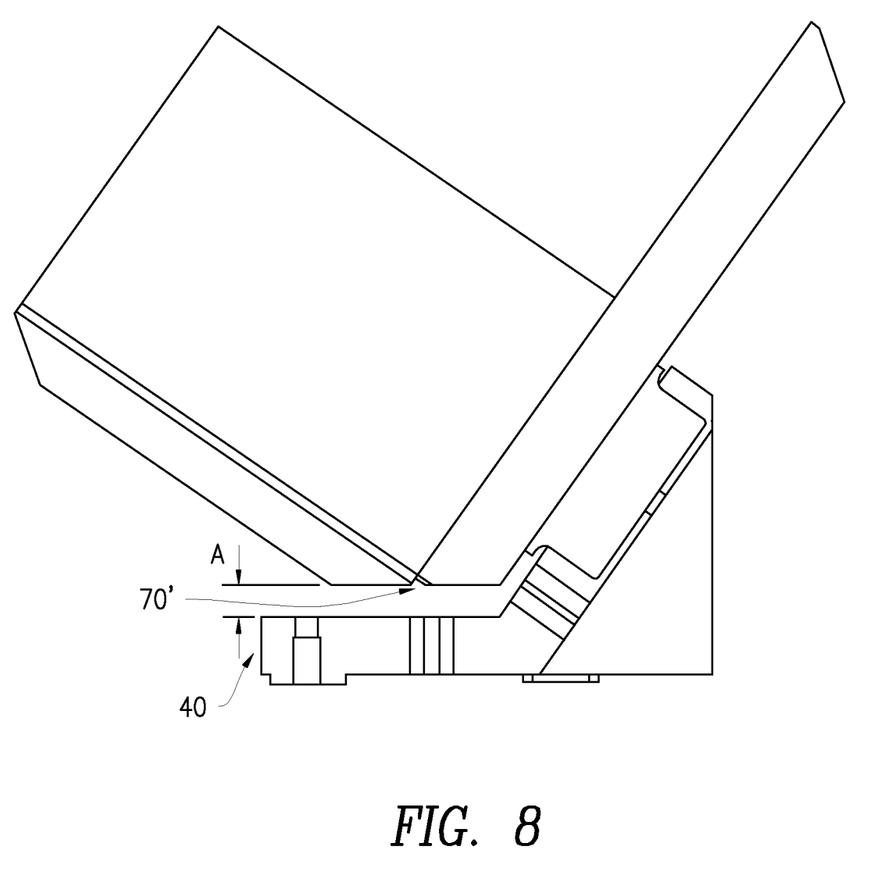
FIG. 8 is a cross-sectional view of the structure of FIG. 7.
Figure 9:
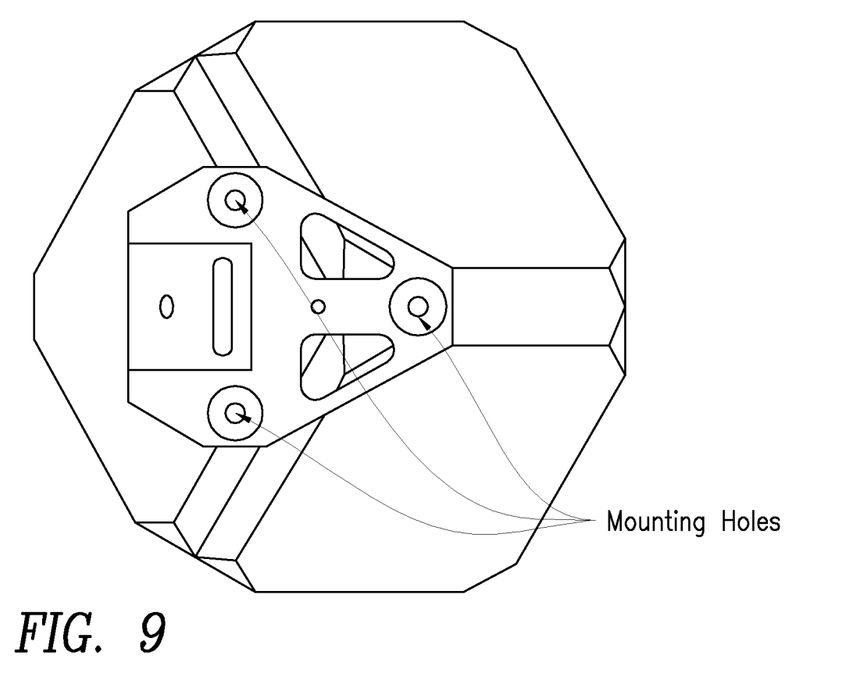
FIG. 9 is a bottom plan view of the structure of FIG. 7.
Figure 10:
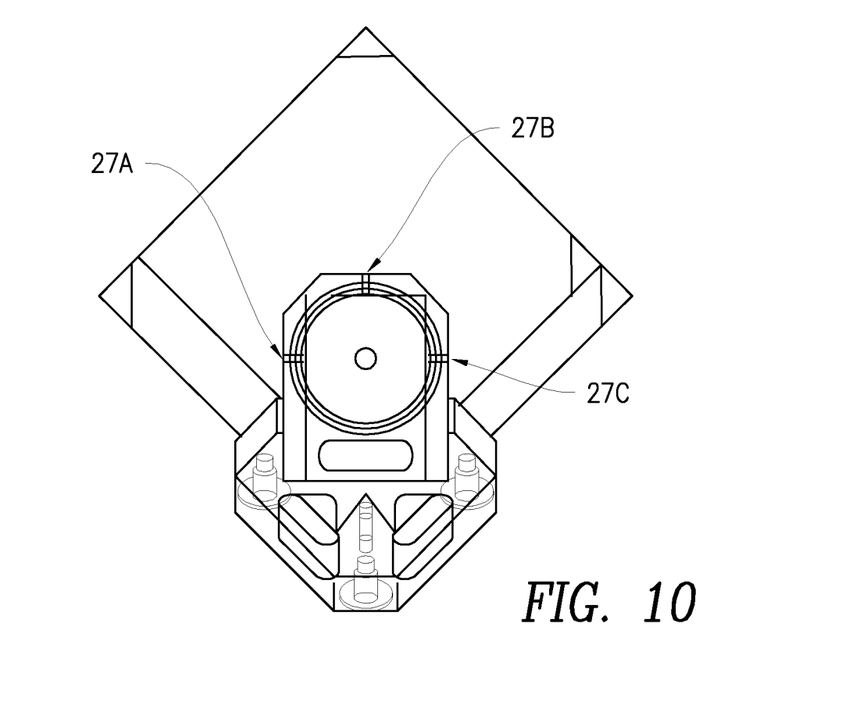
FIG. 10 is back view of the structure of FIG. 7.

Finally, the mounting structure of the base element 30 has a bottom or mounting protrusion 35 extending therefrom, as is best seen in FIGS. 4 and 6. The bottom protrusion minimizes the surface area of the contact between mounting structure 40 and the another structure to which the optical assembly is ultimately to be mounted. Extending through bottom protrusion 35 and mounting structure 40 is another opening 45 through which is received the mounting mechanism (screw, bolt, etc.) used to secure the mounting structure to the another structure. When secured together, the construction is designed to have the apex 70 of the hollow retroreflector (FIG. 3) centered above the center line of the another opening 45 running through the bottom protrusion and the mounting structure.

In another construction of the improved mount, for use with larger optical structures, as with the larger hollow retroreflector of FIGS. 7-10, the apex 70' of the retroreflector is centered, not over the center line of opening 45 in the mount, but kinematically between the three openings 45A, 45B and 45C through the mount for use with such larger optical structures.

Extremely high stability is achieved through this construction. In particular, stability of only a single micron of movement (change in distance) between the apex of the retroreflector and the surface of the mounting structure (shown as distance "A" in FIGS. 2 and 8), is achieved.

The protruding member and the mount are all preferably made of Invar. This allows for no distortion in the wavefront of any of the optical surfaces of the optical structure, even with temperature changes.

The method of mounting the optical structure onto the mount is to form an optical structure having a reflective surface and a portion of the mount comprising the first and second portions of the protruding member extending from a back surface of the optical structure, wherein the protruding member is either integrally formed with, or bonded to, the back surface of the optical structure. Forming the remainder of the mount comprising a base element having a construction for allowing the mount to be mounted to another structure, the mount further having an upper element having a first cavity therein. Applying adhesive to the circumference of the second portion of the protruding member in a 1/10,000 of an inch layer. Precisely sliding the second portion of the protruding member into the first cavity of the mount, forcing air out of the cavity through the opening at the bottom thereof so that the adhesive is not disturbed. Allowing the adhesive to cure.

In accordance with at least an additional aspect of the invention, the method of mounting the optical structure onto the mount is via a machine guided, precisely measured and calibrated system to ensure the least amount of disturbance of the adhesive layer while the second portion of the protruding member is slid into the cavity that is only 1/10,000 of an inch larger in diameter than the diameter of the second portion of the protruding member.

It will thus be seen that the objects set forth above, among those made apparent from the preceding description, are efficiently attained, and, since numerous/certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A mount assembly for an optical structure, comprising:
   an optical structure comprising at least one mirror panel, the mirror panel comprising a reflective surface and a back surface substantially opposite the reflective surface;
   a protruding member extending from the back surface of the optical structure, comprising two portions, a first portion having a first shape having a first area and a second portion having a second shape having a second area, wherein the first portion is located between the second portion and the back surface of the optical structure and wherein the first area is larger than the second area; and
   a base, comprising a mounting element and an upper element extending from the mounting element, the upper element having a cavity for receipt therein of at least a portion of the second portion of the protruding member.

2. The mount assembly of claim 1, wherein the receiving cavity of the upper element has a third area larger than the second area of the second portion of the protruding member, so that an outside surface of the second portion of the protruding member is ten thousandths ($1/10,000$) of an inch away from a corresponding inner surface of the receiving cavity when the portion of the second portion of the protruding member is secured within the cavity.

3. The mount assembly of claim 2, wherein the first area, the second area and the third area are each substantially circular.

4. The mount assembly of claim 1, wherein the optical structure is a hollow retroreflector.

5. The mount assembly of claim 4, further comprising means for mounting the assembly to another structure.

6. The mount assembly of claim 5, the mounting means comprising:
   a mounting protrusion extending from a bottom surface of the mounting element of the base;
   an opening extending all the way through the mounting element and the mounting protrusion for receipt therethrough of means for securing the mount assembly to another structure;
   wherein a center line running through the opening also corresponds in position with and runs through an imaginary apex of the hollow retroreflector.

7. The mount assembly of claim 5, the mounting means comprising:
   three openings through the mounting element for receipt through each opening of means for securing the mount assembly to another structure, each of the three openings having an imaginary center line running therethrough;
   wherein an imaginary apex of the retroreflector is kinematically centered between the three imaginary center lines of the openings.

8. The mount assembly of claim 2, further comprising a layer of bonding material applied to the outside surface of the second portion of the protruding member in a thickness of ten thousandths ($1/10,000$) of an inch to precisely match and fit within the ten thousandths of an inch space between the outside surface of the second portion of the protruding member and the corresponding inner surface of the receiving cavity.

9. The mount assembly of claim 2, further comprising an opening through a bottom surface of the cavity of the upper element to allow escape of air from the cavity when the protruding member having the bonding material is inserted into the cavity.

10. The mount assembly of claim 9, further comprising a second opening through the upper element into the cavity through which a bonding material is injected into the cavity after the at least a portion of the second portion of the protruding member is in the cavity, wherein the bonding material substantially fills the ten thousandths of an inch space between the outside surface of the second portion of the protruding member and the corresponding inner surface of the receiving cavity.

11. The mount assembly of claim 1, further comprising at least two openings through the upper element into the cavity and a mounting pin adhered within and through each opening of the at least two of openings, each mounting pin in contact with and which acting together center and hold the second portion of the protruding member in the cavity.

12. The mount assembly of claim 11, the at least two openings comprising first, second and third openings through the upper element into the cavity and the mounting pin comprising a first mounting pin adhered within and through the first opening, a second mounting pin adhered within and through the second opening and a third mounting pin adhered within and through the third opening, the mounting pins in contact with and which acting together center and hold the second portion of the protruding member in the cavity.

13. A mount assembly for an optical structure, comprising:
   an optical structure comprising at least one mirror panel, the mirror panel comprising a reflective surface and a back surface substantially opposite the reflective surface;
   a protruding member extending from the back surface of the optical structure;
   a base, comprising a mounting element and an upper element extending from the mounting element, the upper element having a cavity for receipt therein of at least a portion of protruding member; and
   at least two openings through the upper element into the cavity and a mounting pin adhered within and through each opening of the at least two of openings, each mounting pin in contact with and which acting together center and hold the second portion of the protruding member in the cavity.

14. The mount assembly of claim 13, wherein the mounting pins are secured within the openings by adhesive.

15. The mount assembly of claim 13, the at least two openings comprising first, second and third openings through the upper element into the cavity and the mounting pin comprising a first mounting pin adhered within and through the first opening, a second mounting pin adhered within and through the second opening and a third mounting pin adhered within and through the third opening, the mounting pins in contact with and which acting together center and hold the second portion of the protruding member in the cavity.

16. A mount assembly for an optical structure, comprising:
an optical structure comprising at least one mirror panel, the mirror panel comprising a reflective surface and a back surface substantially opposite the reflective surface;
a protruding member extending from the back surface of the optical structure;
a base comprising a mounting element and an upper element extending from the mounting element, the upper element having a cavity for receipt therein of at least a portion of the protruding member; and
the mounting element comprising three openings therethrough wherein each of the openings receives therethrough means for securing the mount assembly to another structure, each of the three openings having an imaginary center line running therethrough wherein an imaginary apex of the retroreflector is kinematically centered between the three imaginary center lines of the openings.

17. A method of mounting an optical structure, comprising the steps of:
adhering a protruding member having a shape and an outside surface around the shape, to a back surface of the optical structure;
applying a bonding material over the outside surface of the shape of the protruding member; and
inserting at least a portion of the protruding member into a cavity located within a base of a mounting assembly.

18. For an optical structure comprising at least one mirror panel, the mirror panel comprising a reflective surface and a back surface substantially opposite the reflective surface, and a protruding member extending from the back surface of the optical structure, a method of mounting the optical structure to a base used to mount the optical structure and base to another structure, comprising the steps of:
forming at least two openings through a portion of the base;
inserting at least a portion of the protruding member into a cavity in the base meant to receive the at least a portion of the protruding member;
inserting a pin into each of the at least two openings so that an end of each pin touches the protruding member in the cavity;
centering the protruding member in the cavity through adjustments made in the positioning of the pins; and
securing the pins with an adhesive in their positions in the openings of holding the protruding member centered in the cavity.

* * * * *